United States Patent [19]

Donzis

[11] 4,191,243
[45] Mar. 4, 1980

[54] CHANNEL BEAM HAVING HEAT TRANSFER FLUID VOLUME DEFINED THEREIN

[76] Inventor: Byron A. Donzis, 24 Lana La., Houston, Tex. 77027

[21] Appl. No.: 842,089

[22] Filed: Oct. 14, 1977

[51] Int. Cl.$^2$ ............................................ F28D 21/00
[52] U.S. Cl. ...................................... 165/45; 52/738; 52/168; 126/448; 165/47; 52/729; 237/69
[58] Field of Search ....................... 165/49, 53, 54, 55, 165/56, 57, 45, 47, 168; 237/1 A, 69; 126/271.1, 271; 52/508, 729, 738, 168; 285/DIG. 2; 38/89

[56] References Cited

U.S. PATENT DOCUMENTS

| | | | |
|---|---|---|---|
| 3,009,548 | 11/1961 | Miller | 52/738 X |
| 3,190,816 | 6/1965 | Adamec | 126/271 X |
| 3,550,679 | 12/1970 | Benbow | 165/47 |
| 3,818,892 | 6/1974 | Von Kohorn | 126/271.1 |

Primary Examiner—Albert W. Davis, Jr.
Assistant Examiner—Margaret A. Focarino

[57] ABSTRACT

A channel beam is characterized by a base portion having upper and lower surfaces thereon with first and second legs depending from the lower surface thereof. A cross piece is disposed between the first and second legs and cooperates with the legs and the lower surface of the base portion to define a region adapted to carry a heat transfer fluid. End caps are provided at the ends of the channel beam to enclose the region and define an enclosed interior volume. Each channel beam is adapted for interconnection with a next-adjacent channel beam such that the upper surfaces thereof define a substantially continuous surface area useful as an athletic playing area. The interior volume of each next-adjacent channel beam may be interconnected through inlet and outlet means so as to define a continuous heat transfer fluid conduction path beneath the athletic playing area so that heat energy incident on the surface area may be transferred to the heat transfer fluid.

15 Claims, 3 Drawing Figures

U.S. Patent  Mar. 4, 1980  4,191,243
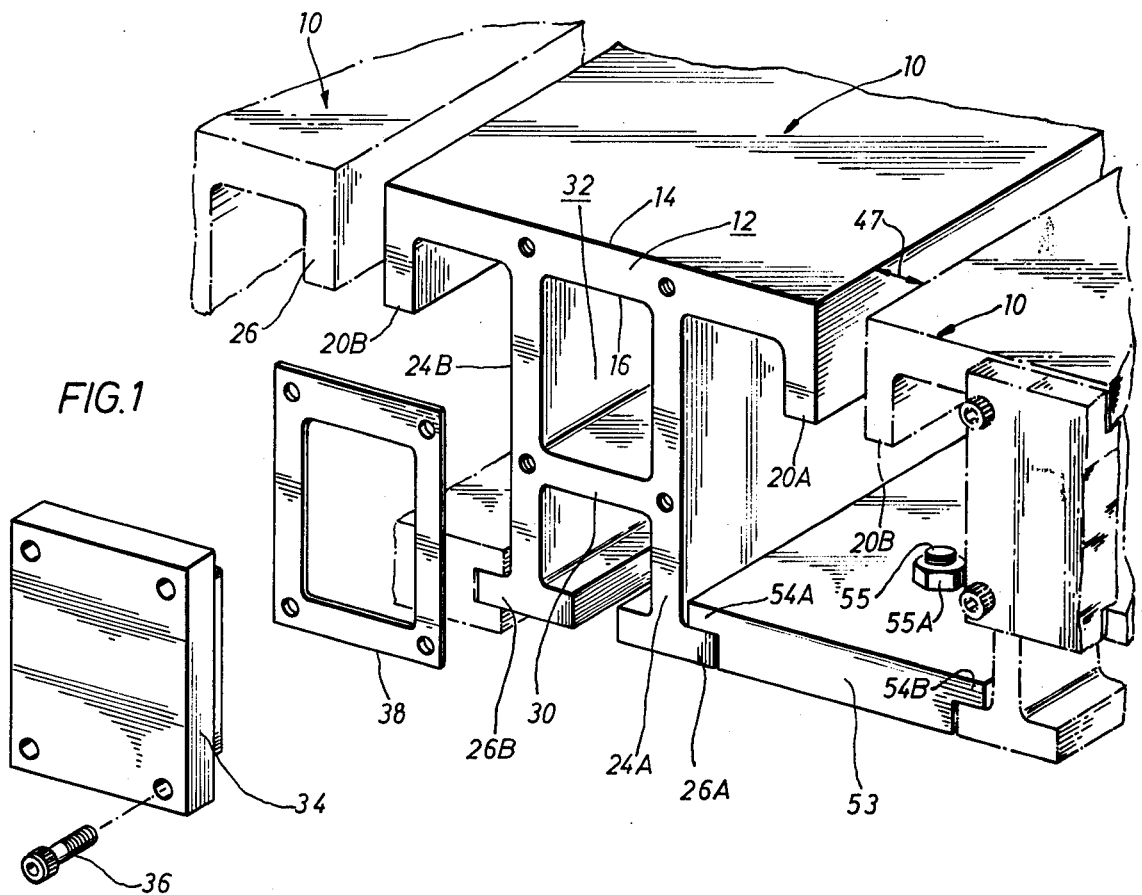
FIG.1
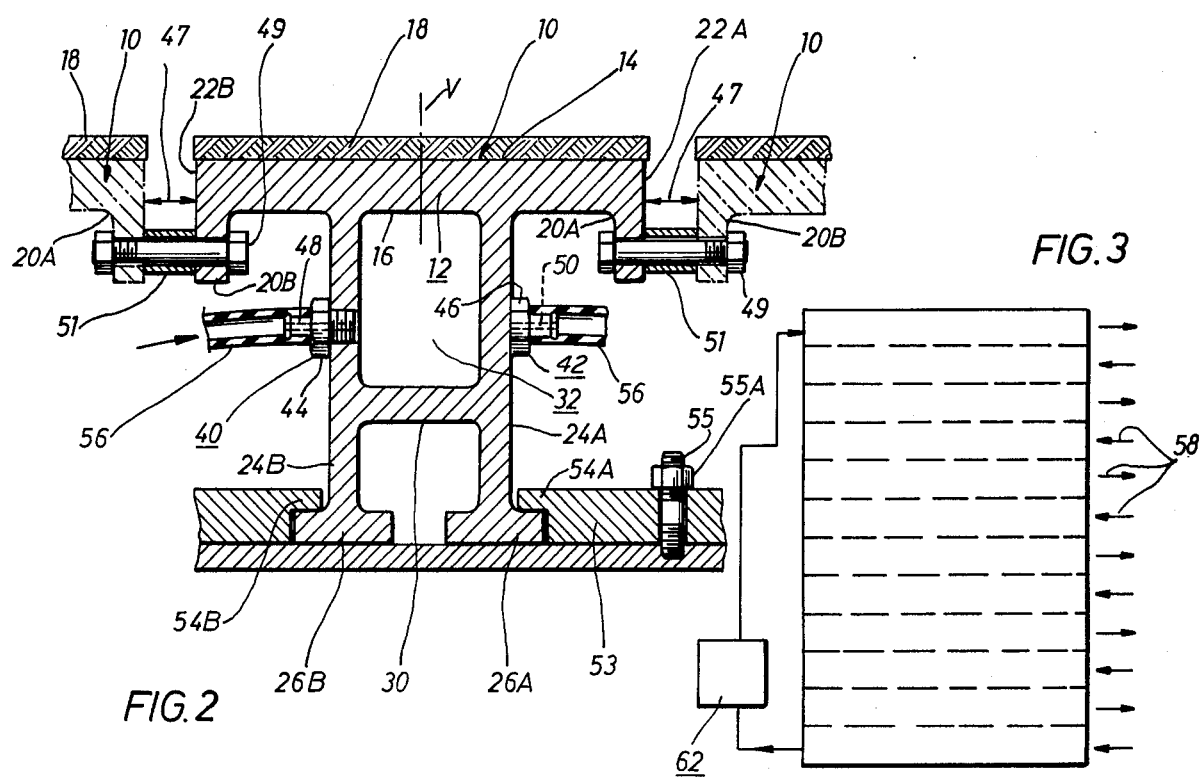
FIG.2
FIG.3

CHANNEL BEAM HAVING HEAT TRANSFER FLUID VOLUME DEFINED THEREIN

BACKGROUND OF THE INVENTION

1. Field of the Invention

This invention relates to channel beams, and in particular, channel beams having an enclosed volume adapted to carry a heat transfer fluid therewithin.

2. Description of the Prior Art

Channel beams or other structural fabrication members are well known in the art. Such beams, when viewed in cross section, typically define C-shapes, I-shapes, T-shapes, or Pi-shapes. Prior art channel beams are typically extruded although they have in the past been fabricated from stock material. Channel beams are typically inexpensive to fabricate and lend themselves to a wide variety of structural uses. Aside from their structural and construction utility, channel beams of the prior art typically do not lend themselves to the conduction of fluids.

Usually, a plurality of channel beams are disposed in a predetermined array such that load-supporting surfaces on each beam are presented in a load-accepting configuration. Since channel beams exhibit a high-degree of structural stability and strength they are advantageous for structural construction purposes. For example, channel beams may be utilized in a configuration whereby the load-supporting surfaces of each beam are disposed in next-adjacency so that the load-supporting surfaces define a substantially continuous surface area. Such surface areas may be lined and demarcated for athletic events, or may also be disposed as decking in adjacency to swimming areas and the like. As such, they are usually placed in outdoor environments and exposed to sunlight which tends to heat that surface area.

It is well known that naturally occurring energy resources are diminishing. Such a recognition dictates that more efficient utilization of alternative energy producing resources be developed and fostered. Solar energy has been recognized as an advantageous alternate source of energy.

It would be advantageous, therefore, to provide an arrangement whereby the heat energy of the sun incident upon the surface area defined by the load-supporting surfaces of adjacent channel beams could be utilized instead of wasted. It would, therefore, be of advantage to provide an arrangement whereby a heat transfer fluid may be disposed in a heat transfer relationship with the surface area defined by the load-supporting surfaces of adjacent channel beams such that the energy collected by the surface area may be transferred to the fluid and utilized advantageously.

SUMMARY OF THE INVENTION

This invention relates to a channel beam adapted to define an enclosed volume therein able to carry a heat transfer fluid in a heat transfer relationship with the load-supporting surface of the channel beam such that energy incident upon and collected by the load-supporting surface of the channel beam may be transferred to the fluid for advantageous utilization. A channel beam of the present invention is substantially Pi-shaped in cross section with a base portion having an upper, load-supporting, surface and a lower surface thereon. First and second substantially downwardly extending legs depend from the lower surface of the base portion. A cross-piece is disposed between the first and second legs and cooperates with the first and second legs and the lower surface of the base portion to define an interior region adapted to receive a heat transfer fluid. The region may be enclosed by the provision of first and second end caps attached at the ends of the channel beam to define an interior volume coextensive with the length of the beam. Suitable inlet and outlet means are provided to introduce and withdraw the heat transfer fluid from the enclosed interior volume of the channel beam.

A channel beam of the present invention may be advantageously placed in next-adjacency to an identical channel beam such that the upper, load-supporting surfaces thereof may be placed substantially proximal to each other to define a substantially continuous surface area. Such surface area may, for example, be utilized as a pool decking, an athletic playing surface or the like. The interior volumes of the adjacent channel beams may be disposed with inlets and outlets interconnected such that a continuous heat transfer fluid conduction path is defined beneath the athletic surface area defined by adjacent beams. A heat transfer fluid disposed within and pumped through the interior volume lies in a heat transfer relationship with the base portion of the channel beam such that solar energy incident on the load-supporting surface of each channel beam is transferred to the heat transfer fluid flowing within the interior volumes thereof for conversion to more usable energy forms.

DESCRIPTION OF THE DRAWINGS

The invention will be more fully understood from the following detailed description thereof, taken in connection with the accompanying drawings, which form a part of this application, and in which:

FIG. 1 is an exploded perspective view of a channel beam having a heat transfer fluid conducting volume in accordance with the teachings of this invention;

FIG. 2 is an elevational view entirely in section of the channel beam of FIG. 1; and, FIG. 3 is a plan view of a typical operating environment wherein a plurality of channel beams embodying the teachings of this invention are disposed in next-adjacency to define a substantially continuous surface area.

DESCRIPTION OF THE PREFERRED EMBODIMENT

Throughout the following description similar reference numerals refer to similar elements in all figures of the drawings.

With reference to FIGS. 1 and 2, a channel beam generally indicated by reference numeral 10 embodying the teachings of this invention is illustrated. It is to be understood that the beam 10 may be extruded of aluminum alloy or other material in any suitable length or surface dimension. Alternately, of course, a channel beam 10 embodying these teachings may be fabricated of stock material. The channel beam 10 is a substantially Pi-shaped member having a base portion 12 with an upper surface 14 and lower surface 16 thereon. The upper surface 14 is typically the load-supporting surface of the channel beam and may, for purposes made more clear herein, be provided with a suitable covering 18, as for example, an asphalt based athletic composition material. It is understood that although the upper load-supporting surface 14 is illustrated as being substantially planar as viewed in the figures, that surface may assume any predetermined configuration consistent with the end use to which the beam is placed. As but two other examples, the surface 14 may be sloped if the environment is a swimming pool or the like, or banked if used as a jogging track. The lower surface 16 may, likewise, be other than a substantially planar surface. The base portion 12 has mounting flanges 20A and 20B along the edges thereof, the flanges 20 defining mounting surfaces 22A and 22B thereon for purposes which are made more clear herein.

Depending from the lower surface 16 of the base portion 12 are first and second legs 24A and 24B, respectively. Although the legs 24 are illustrated as extending substantially perpendicular from the lower surface 16 of the base portion 12, it is understood that the legs 24 may be mounted so as to define a predetermined angle therewith. The legs 24 terminate in first and second mounting feet 26A and 26B, respectively. The legs 24 need not be equal in length, it being within the contemplation of this invention to define a channel beam adapted for mounting on inclined or canted surfaces. Furthermore, consistent with this objective, the mounting feet 26 may be inclined such that when channel beams embodying the teachings of this invention are mounted on a canted surface the upper-load-supporting surface 14 of the base portion 12 may extend substantially parallel to a predetermined datum.

Mounted between the first and second legs 24A and 24B is a cross piece 30. The cross piece 30, taken in cooperative association with the lower surface 16 of the base portion 12 and with that portion of the legs 24 disposed between the points of attachment with the base 12 and the cross piece 30, define a heat conduction region 32 on the interior of the channel beam 10.

As best viewed in FIG. 1, end caps 34 may be provided at each axial end of the beam 10 so as to totally enclose the heat conduction region 32 and define an enclosed volume on the interior of the channel beam 10. The end caps 34 (only one of which is illustrated) may be secured at the ends of the channel beams 10 by any suitable means of attachment, such as a close fitting projection (not shown) adapted to be press fit into the ends of the channel or by bolts 36 provided for the purpose. A suitable gasket or sealing arrangement 38 may also be utilized if desired.

Inlet means generally indicated by reference numeral 40 and outlet means generally indicated by reference numeral 42 may be provided for respectively, introducing and exhausting a heat transfer fluid from the conduction volume 32. The means 40 and 42 may each typically comprise a threaded nipple 44 and 46, respectively, each having an access appeture 48 and 50 therethrough. The inlet means 40 and outlet means 42 are appropriately sized so that no pressure drop or flow inhibiting tendencies are generated during the pumping of heat transfer fluid into and out of the volume 32. The inlet means 40 and outlet means 42 are illustrated in FIG. 2 as on opposite sides of the vertical plane V of the channel beam 10, and it is understood that they are disposed at opposite axial ends of the beam. Of course, other suitable locations (as, for example, on the end caps 34) remain within the contemplation of this invention. Alternately, of course, inlet and outlet headers may be used.

As viewed in FIG. 3, channel beams 10 embodying the teachings of this invention are adapted to be disposed in next-adjacency one with the other so that the upper load-supporting surfaces 14 of each next-adjacent beam 10 are substantially contiguous to define a substantially continuous surface area thereby. With the channel beams 10 substantially in next-adjacency, the mounting surfaces 22 on the mounting flanges 20 of each of the adjacent channel are spaced a predetermined clearance 47 apart. The clearance 47, on the order of one-quarter inch, provides a suitable space for the insertion of a mounting tool, as discussed herein. The channels may be secured by a mounting bolt 49 having a spacer 51, if desired. To prevent shifting of adjacent beams 10, the mounting feet 26 of each beam may be secured to a foundation or to the earth by the use of a flanged mounting plate 53. The flanges 54A and 54B of the mounting plate 53 respectively overlie the mounting foot 26A of a first channel and the mounting foot 26B of a next-adjacent channel. The mounting plate 53 is secured into the foundation by the engagement of a mounting stud 55 having a nut 55A associated therewith. Access to the stud 55 and nut 55A is gained by inserting a suitable tool through the clearance 47. It is appreciated that the clearance spaces 47 provide drainage spaces whereby moisture incident on the surface 18 may be removed therefrom. Of course, if desired, the covering 18 may alternatively cover-over and fill in the spaces 47 after fabrication.

With a plurality of identical beams 10 each embodying the teachings of this invention disposed and secured in next-adjacency so as to define a substantially continuous surface area, it is advantageous to interconnect the inlet means 40 of a given beam 10 with the outlet means 42 of the next-adjacent beam 10 by a suitable connector, as a rubberized hose 56, so that the heat conduction fluid volumes 32 disposed on the interior of each beam are brought into fluid communication one with the other and thereby define a substantially continuous conduction path beneath the planar surface area. A heat transfer fluid, such as ethylene glycol, air, or water, may then be advantageously introduced into a heat transfer relationship within the interconnected interior volumes 32 of the channel beam 10. As seen in FIG. 3, the load-bearing upper surface 14 of adjacent beams 10 define a substantially planar area thereon. The heat transfer fluid conduction path is indicated by reference arrows 58. With the fluid pumped through the interior volumes 32 of the interconnected channel beams, heat energy incident on the upper surface area may be advantageously transferred to the heat transfer fluid flowing within the volumes 32 and conducted to suitable means 62 for converting heated water to a more useful form of energy.

Having defined a preferred embodiment of the invention those with skill in the art having benefit of the above teachings may effect numerous modifications thereto. It is understood, however, that such modifications are within the contemplation of this invention and within the scope of the appended claims.

What is claimed is:

1. A channel beam comprising:
   a base portion having an upper and lower surface and a first and a second lateral edge thereon;
   first and second legs depending from the lower surface of the base portion from points intermediate the lateral edges;
   a cross piece disposed between the legs and cooperating with the legs and the lower surface of the base portion to define a region adapted to carry a heat transfer fluid therein;

end caps able to be secured to each axial end of the beam to enclose the region and define an interior volume within the channel beam; and means disposed below the lower surface of the base portion for inletting and outletting fluid from the interior volume.

2. The channel beam of claim 1 wherein the channel beam is extruded.

3. The channel beam of claim 2, wherein the material utilized in the extruded channel beam is aluminum.

4. The channel beam of claim 1 wherein a portion of the legs extend below the cross piece.

5. The channel beam of claim 4 wherein the legs terminate in support feet.

6. A channel beam comprising:
a base portion having an upper and lower surface thereon, the upper surface being substantially planar and having an athletic composition material disposed thereon;
first and second legs depending from the lower surface of the base portion; and,
a cross piece disposed between the legs and cooperating with the legs and the lower surface of the base portion to define a region adapted to carry a heat transfer fluid therein.

7. The channel beam of claim 6 wherein the channel beam is extruded.

8. The channel beam of claim 7 wherein the material utilized in the extruded channel beam is aluminum.

9. The channel beam of claim 6 further comprising:
end caps able to be secured at each axial end thereof to enclose the region and define an interior volume within the channel beam; and,
means for inletting and outletting fluid from the interior volume.

10. The channel beam of claim 9 wherein a portion of the legs extend below the cross piece.

11. The channel beam of claim 10 wherein the legs terminate in support feet.

12. A substantially planar athletic playing surface comprising:
a first and a second channel beam disposed in next-adjacency one with the other, each channel beam comprising:
a base portion having an upper and a lower surface thereon, the upper surface being substantially planar and having an athletic composition material disposed thereon;
first and second legs depending from the lower surface of the base portion;
a cross piece disposed between the legs and cooperating with the legs and the lower surface of the base portion to define a region adapted to carry a heat transfer fluid therein; and,
end caps securable to each axial end of each beam to enclose each region therein and define an interior volume within each channel beam;
means disposed below the lower surface of the base portion of each channel beam for inletting and outletting a heat transfer fluid from the interior volumes thereof; and,
means connecting the outlet of the first beam to the inlet of the second beam to define a continuous conduction path for the heat transfer fluid beneath the planar surface area.

13. The athletic playing surface of claim 12 wherein the legs of each channel beam extend below the cross piece thereof, and wherein each leg of each channel beam terminates in a support foot, and further comprising:
a mounting member having flanges thereon sized to overlap a support foot on each channel beam, the mounting member being of a transverse dimension such that a clearance space sized to receive a mounting tool for the purpose of securing the mounting member to a surface is defined between the lateral edges of the first and second channel beams when the mounting member overlaps each support foot.

14. The athletic playing area of claim 12 wherein each channel beam is fabricated of extruded aluminum.

15. The athletic playing area of claim 13 wherein each channel beam is fabricated of extruded aluminum.

* * * * *